Patented Aug. 22, 1950

2,520,041

UNITED STATES PATENT OFFICE 2,520,041

PROCESS FOR PRODUCING 2-CARBOXY-QUINOLINE COMPOUNDS

George F. Lisk, Buffalo, and Gardner W. Stacy, New York, N. Y., assignors to the United States of America as represented by the Secretary of War No Drawing. Application June 20, 1947, Serial No. 756,082

4 Claims. (Cl. 260—287)

The present invention relates to an improved process for the production of compounds useful in the production of pharmaceutical preparations having antimalarial properties. Among these preparations are, importantly the antimalarial drugs of the 4-amino-7-chloroquinoline type.

More particularly, the present invention relates to an improved process for cyclizing β-carboxy-β-m-substituted N-arylamino-acrylates to compounds of the quinoline series.

According to the prior art, cyclization of the compounds of the above-indicated type to quinoline compounds is carried out by heating them in the presence of an inert high-boiling solvent, such as mineral oil or phenanthrene, to elevated temperatures, e. g., 250° C. When the arylamino-acrylate compound employed is unsubstituted in both of the ortho-positions in the aryl nucleus with respect to the amino group, and is further substituted in a meta-position with respect to the said amino group, the process will give rise to a mixture of isomeric quinolines. Thus, for example, the cyclization of ethyl-β-carbethoxy-β-m-chloranilino-acrylate yields a mixture of the 5- and 7-chloro-derivatives of ethyl-4-hydroxy-quinoline-2-carboxylate, of which only the 7-chloro isomer is of value for preparing the outstanding antimalarial drugs of the 4-amino-7-chloro-quinoline type. This reaction may be indicated as follows:

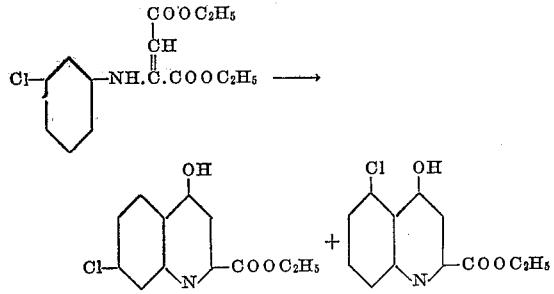

From the foregoing reaction, it will be seen that equi-molal amounts of the 5- and 7-chloro-derivatives normally will be produced, although as aforesaid, only the 7-derivative is of value in the production of antimalarial compounds of the 4-amino-7-chloroquinoline type.

In accordance with the present invention, it has been discovered that the molecular ratio of these isomers is affected very markedly by the amount of solvent which is used in the cyclization step. More specifically, the present invention comprises the discovery that when β-carbethoxy-β-m-chloranilino-ethyl-acrylate is cyclized in an inert solvent comprising principally diphenyl ether, the proportion of the 7-chloro-isomer to the 5-chloro-isomer can be increased very greatly, without substantially reducing the total yield of isomeric quinolines, thereby greatly increasing the yield of the desired 7-chloro-isomer, when the cyclization is conducted in the presence of more than two and preferably more than five parts by weight of the diphenyl ether solvent. For purposes of the invention, a conveniently suitable solvent is the commercial solvent preparation known to the trade as "Dowtherm," which is an eutectic mixture of diphenyl ether and 26.5 per cent of diphenyl, the composition melting at 12° C., and boiling at approximately 258° C.

The present invention is illustrated by the following example, which is to be regarded as illustrative only of the process, and not limiting in all of its specific details:

EXAMPLE

A. Cyclization of the anil

One hundred parts by weight of the anil obtained from sodium oxalacetic diethyl ester and m-chloraniline hydrochloride, were mixed with 1500 parts by weight of the aforesaid "Dowtherm" solvent. The mixture was heated to approximately 250° C., the temperature of the mixture being thus raised during fifteen to twenty minutes. The mixture then was agitated at 250° C. for ten minutes to complete the cyclization, and then cooled to about 80° C.

B. Saponification of the chlorohydroxyquinoline carboxylic acid esters

To the mixture produced in (A) above, there were added 540 parts by weight of water and 160 parts by weight of 50 per cent aqueous caustic soda, and the resulting mass was heated to boiling and refluxed with agitation for three-fourths hour to complete the saponification of the quinoline carboxyl esters formed in the cyclization step. The reaction mass was allowed to stratify, after which the aqueous phase was separated from the solvent layer. The hot aqueous portion was agitated with ten parts by weight of decolorizing carbon, and filtered. The filtrate was cooled and made acid to Congo red with about 230 parts by weight of 20° Bé. hydrochloric acid to precipitate the free quinoline carboxylic acids. The latter were isolated as a cake by filtration, and the cake was washed with a small amount of cold water and dried. There were obtained in this manner 56 parts by weight of a mixture of 5- chloro-4-hydroxyquinoline-2-carboxylic acid and 7-chloro-4-hydroxyquinoline-2 - carboxylic acid, or 75 per cent of the theoretical yield of chlorohydroxyquinoline carboxylic acids. On analysis of this mixture, by conversion thereof to 4,5 and 4,7-dichloroquinolines, and determination of the relative proportions of 4,5 and 4,7-dichloroquinoline isomers in the mixture, it was found that the 7-chloro- and 5-chloro-isomers were present in the ratio of 1 to 1.2.

By varying the amount of the inert solvent used in the cyclization step without otherwise departing from the foregoing conditions, the ratio and yields of isomeric 5-chloro- and 7-chloro-4-hydroxyquinoline-2-carboxylic acids varied as shown in the table below:

TABLE

| Parts of Dowtherm per part of Anil (by weight) | Yield of mixed isomers (Percent Theory) | Ratio of 7-chloro isomer to 5-chloro isomer | Yield of 7-chloro-4-hydroxyquinoline 2-carboxylic acid (Percent Theory) |
|---|---|---|---|
| 2 | 53 | 1:9 | 5.3 |
| 4 | 62 | 1:3.2 | 14.8 |
| 8 | 70 | 1:1.3 | 30.4 |
| 15 | 75 | 1:1.2 | 34.1 |
| 30 | 70 | 1:0.65 | 42.4 |

For practical purposes, a ratio of from 5 to 20 parts of the "Dowtherm" solvent for each part by weight of $\beta$-carboxy-$\beta$-substituted-N-arylamino acrylate is preferred. The use of materially larger amounts of the solvent, for example, 40 parts, is found to be less advantageous since the greatly increased batch volumes reduce production capacity. It is found that the yield of the 7-isomer does not increase substantially above the figure shown in the foregoing table for the run of greatest dilution, with the use of higher amounts of solvent.

Straight diphenyl ether may be used as the solvent instead of the "Dowtherm" employed in the example. These diphenyl ether type solvents are particularly suitable for use in that reaction since they are inert, and are re-usable many times in the reaction, and possess high fluidity at low temperatures.

The process of the present invention can be applied similarly for promoting the formation of 7-substituted-4-hydroxyquinoline-2-carboxylates in the cyclization of other m-substituted arylamino-acrylates of the foregoing type which are capable of giving rise to isomeric compounds; or in other words, in the cyclization of anils obtained from esters of oxalacetic acid and primary arylamines, wherein both positions ortho to the amino group are unsubstituted, and wherein a position meta to the amino group is substituted, such as 3-chloro-4-methoxy-aniline; 3-bromaniline; 3-methoxy-aniline; 3-chloro-5-methylaniline; and 2-aminonaphthalene; these being further examples of compounds to which the present process may be applied.

Having thus described our invention, what we claim as new and wish to secure by Letters Patent is:

1. A process for cyclizing $\beta$-carboxy-$\beta$-m-substituted-N-arylamino-acrylates to quinoline compounds, which comprises heating one part by weight of an acrylate compound of the said type to cyclizing temperatures in the presence of approximately five to approximately twenty parts of a solvent consisting substantially of diphenyl ether.

2. A process for cyclizing ethyl-$\beta$-carbethoxy-$\beta$-m-chloranilino acrylate to quinoline compounds, which comprises heating the said acrylate to a cyclizing temperature of approximately 250° C. in the presence of between two and twenty parts of a solvent consisting substantially of diphenyl ether, and maintaining the temperature while agitating the resulting reacting material until at least substantially complete cyclization is effected.

3. In the preparation of antimalarial drugs of the 4-amino-7-chloroquinoline type, the improvement which consists in cyclizing ethyl-$\beta$-carbethoxy-$\beta$-m-chloranilino-acrylate by heating the said acrylate to a cyclizing temperature in the presence of from approximately five to approximately twenty parts by weight of a solvent consisting of diphenyl ether for each part by weight of the said acrylate.

4. A process for cyclizing $\beta$-carboxy-$\beta$-m-substituted-N-arylamino-acrylates to quinoline compounds, which comprises heating one part by weight of an acrylate compound of the foregoing type to cyclizing temperatures in the presence of from approximately two to substantially twenty parts of a solvent consisting principally of diphenyl ether.

GEORGE F. LISK.
GARDNER W. STACY.

REFERENCES CITED

The following references are of record in the file of this patent:

Surrey et al.: J. Am. Chem. Soc., vol. 68, pp. 113–116 (January 1946).

Price et al.: J. Am. Chem. Soc., vol. 68, pp. 1204–1208 (July 1946).